United States Patent [19]
Kovach et al.

[11] Patent Number: 5,879,003
[45] Date of Patent: Mar. 9, 1999

[54] SHEET FEED APPARATUS AND CONTAINER FOR AN IMAGING UNIT

[75] Inventors: Melinda Kaye Kovach, Woodbury; Leigh Allen Mazion, Roseville; Eric Julius Donaldson, Saint Paul, all of Minn.; Jon Edward Holmes, West Melbourne, Fla.; Shawn Lee Allen, Lino Lakes, Minn.

[73] Assignee: Imation Corp., Oakdale, Minn.

[21] Appl. No.: 676,861

[22] Filed: Jul. 3, 1996

[51] Int. Cl.$^6$ ...................................................... B65H 3/52
[52] U.S. Cl. ........................ 271/121; 271/145; 271/162; 271/167; 378/182; 396/598; 396/612
[58] Field of Search .................................. 271/113, 117, 271/121, 145, 162, 164, 167; 206/455; 396/517, 528, 598, 602, 612, 930, 937; 378/174, 182

[56] References Cited

U.S. PATENT DOCUMENTS

| | | | |
|---|---|---|---|
| 1,326,334 | 12/1919 | Gaffney . | |
| 3,831,928 | 8/1974 | Davis | 271/35 |
| 3,934,150 | 1/1976 | Matsumoto et al. | 250/468 |
| 4,809,313 | 2/1989 | Gandolfo | 378/182 |
| 4,860,042 | 8/1989 | Tajima et al. | 354/277 |
| 5,008,694 | 4/1991 | Tajima et al. | 354/277 |
| 5,055,869 | 10/1991 | DiPietro | 354/276 |
| 5,197,090 | 3/1993 | DiPietro | 378/174 |
| 5,314,179 | 5/1994 | Oda et al. | 271/145 |
| 5,320,338 | 6/1994 | Shinohara et al. | 271/164 |
| 5,374,048 | 12/1994 | Takahashi | 271/121 |
| 5,459,548 | 10/1995 | Matsuda et al. | 271/145 X |
| 5,627,354 | 5/1997 | Schneider et al. | 235/375 |
| 5,660,384 | 8/1997 | Kovach et al. | 271/145 |

FOREIGN PATENT DOCUMENTS 96 16352A   5/1996   WIPO .

*Primary Examiner*—David H. Bollinger
*Attorney, Agent, or Firm*—William D. Bauer

[57] ABSTRACT

A sheet feed apparatus for an imaging device. The apparatus includes a drive roller, plurality of sheets of photosensitive material, a photographically inert liner having upper and lower surfaces and a container for storing the sheets of photosensitive material. Proper feeding of the sheets of material and a stable location of the liner are ensured by appropriate coefficients of friction between the respective components. The top surface (19*b*) of the liner (19) to the bottom surface (18B) of the sheets (18) has a first coefficient of friction and the bottom of one sheet (18) to the top of another sheet (18) has a second coefficient of friction, the second coefficient friction being less than the first coefficient of friction, whereby multiple feeds of the sheets are reduced. Preferably, the bottom surface (19*c*) of the liner (19) to the container (16) has a third coefficient of friction, the third coefficient of friction being greater than the first coefficient of friction, whereby the liner (19) is not fed with the last sheets (18). Also preferably, the roller drive surface (25*e*) to a top surface (18*a*) of a sheet (18) has a fourth coefficient of friction, the fourth coefficient of friction being greater than the first coefficient of friction, wherein the last sheet (18) may be fed. Also preferably, the fourth coefficient of friction is greater than the second coefficient of friction, wherein the sheets (18) may be fed by movement of the drive roller (25*c*).

12 Claims, 2 Drawing Sheets

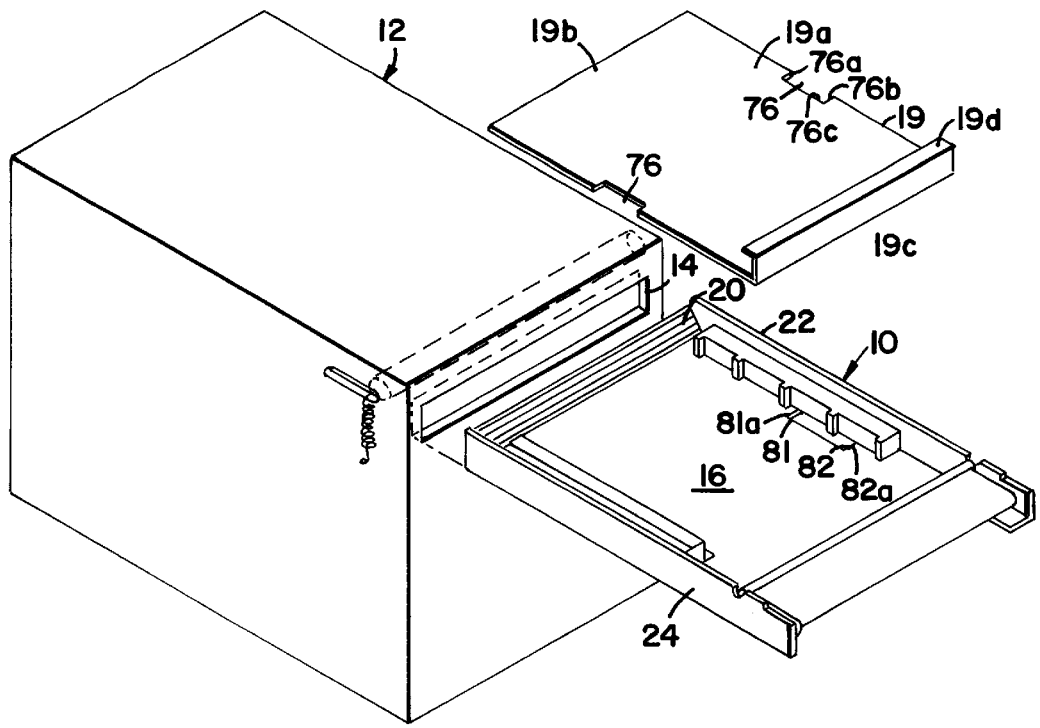
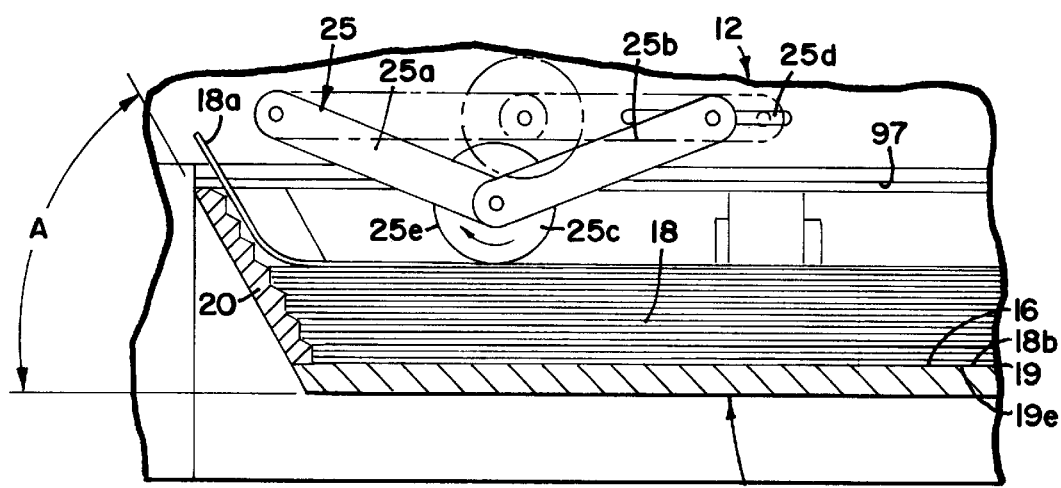

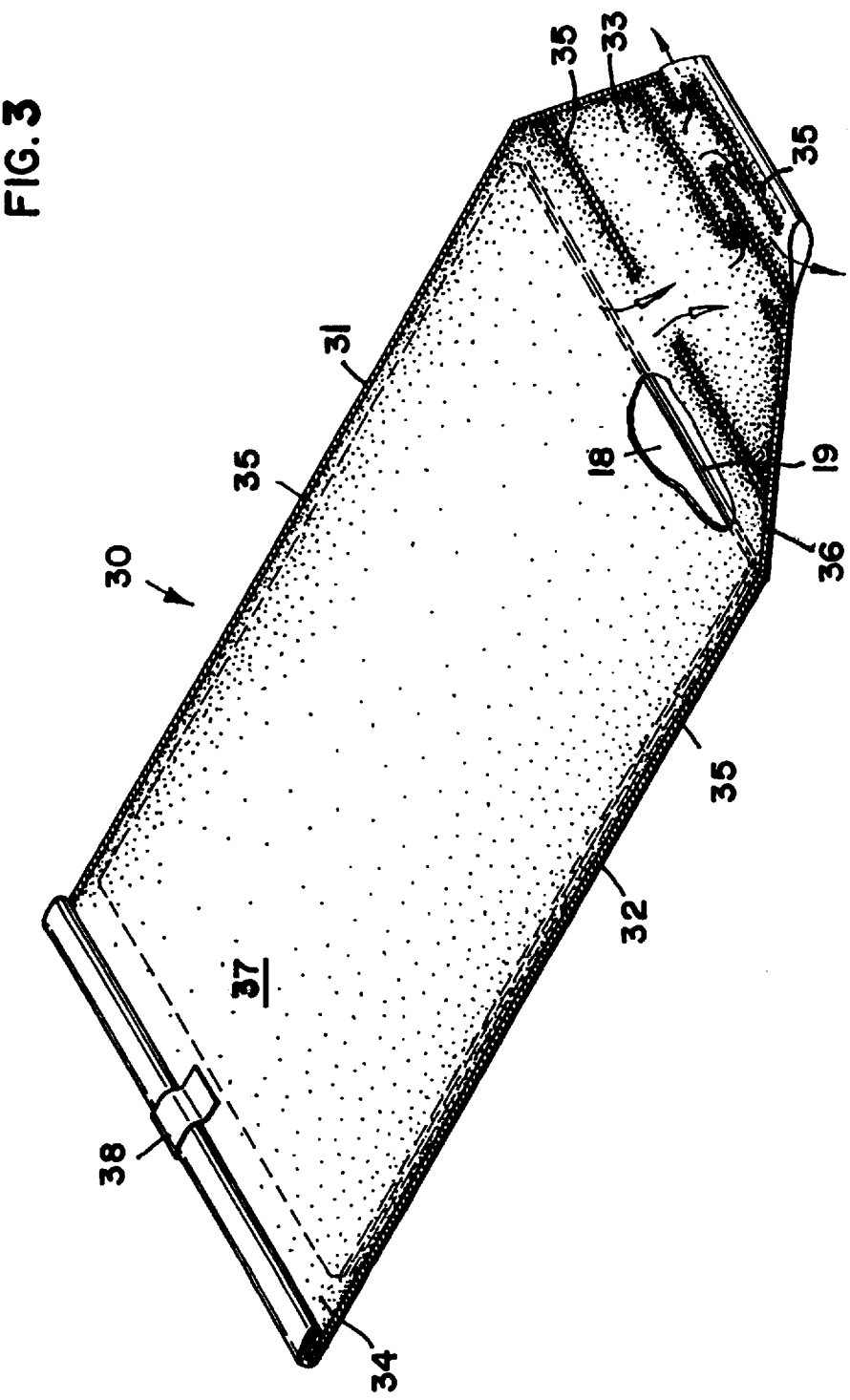

SHEET FEED APPARATUS AND CONTAINER FOR AN IMAGING UNIT

FIELD OF THE INVENTION

The present invention generally relates to an apparatus for dispensing photosensitive media. In particular, the present invention is directed to the frictional relationship between the various components of a photosensitive media container and a feed mechanism of a feed sheet apparatus.

BACKGROUND OF THE INVENTION

Professional imaging systems, such as those employed for medical diagnostic (radiological) applications, having historically captured and recorded images on relatively large sized sheets of photosensitive material, using large volume wet development equipment. With the recent enactment and more rigid enforcement of environmental regulations that require safeguards against exposure to and proper disposal of chemicals used in image development equipment, image processing providers have begun the replacement of these cumbersome and expensive wet-development systems with dry silver processes. For example, in a typical dry silver imaging application for medical diagnostic applications, such as a sonogram or X-ray, the image of interest may be electro-optically captured on a 20.3 cm×25.4 cm (8"×10") sheet of dry silver photosensitive medium, so that the image size is large enough to be viewed and analyzed, is readily physically accommodated within the patient's file, and may be easily handled and stored by medical personnel without exposure to wet chemicals.

In the course of operation of a dry silver process-based imaging system, just as in the use of relatively small hand-held cameras, it is necessary to store the individual frames of the photosensitive media in a light-tight housing, while affording ready access to the frames as they are needed by the imaging equipment. In hand-held cameras, the film packaging is relatively compact, with the film being configured as either a continuous multi-frame roll housed in a light-tight cylindrical canister, or as individual sheets that may be housed in an auto-feed sealed cartridge that is disposable after all of the film sheets have been used. Unfortunately, due to their configuration and small size, neither of these hand-held camera film storage and feed approaches is capable of storing larger sheets of photosensitive material and interfacing such media with the sheet or web advance mechanisms employed by the larger, diagnostic imaging equipment.

Light-tight, single-use containers or packages for larger photosensitive materials used in, for example, medical diagnostic applications are generally known. As shown in U.S. Pat. No. 4,860,042, these light-tight containers can include a film bag or a tray covered by a lid. Also shown are carriages, or holders, which mate with the main body of a film loading device and remove the cover or the film bag while maintaining light-tightness.

Containers for larger photosensitive materials have been designed to function with vacuum or suction feeding mechanisms within an imaging unit. This type of feeding mechanism, which lifts individual sheets of the photosensitive materials from the container and insert them into the imaging station of the imaging unit, requires a vacuum system as well as numerous parts for lifting and inserting the sheets. In addition, this type of feeding system can be susceptible to feeding multiple, rather than individual, sheets which are stuck or blocked together which can adversely affect the imaging process.

In addition, there has recently been developed a kick-feed mechanism for delivering larger photosensitive material wherein the sheets are moved by friction, rather than a vacuum or suction. One example of such a mechanism is shown in co-pending U.S. patent application Ser. No. 08/344,462, filed Nov. 23, 1994, entitled "IMAGING UNIT CONTAINER HAVING SHIFTABLE WALLS". With such a kick-feed mechanism for larger sheets of photosensitive material, problems may develop in the feeding of the sheets of photosensitive material if there is not a proper coefficient of friction relationship between the drive roller, sheets of photosensitive material, liner, and container base. The present invention addresses these concerns and provides for the aforementioned components all having a coefficient of friction which provides for an improved sheet feed apparatus for an imaging device.

SUMMARY OF THE INVENTION

An embodiment of the present invention includes a sheet feed apparatus for an imaging device. The apparatus includes a kick feed mechanism having a drive roller. The drive roller has a drive surface. A plurality of sheets of photosensitive material, each sheet having a top surface and a bottom surface, are placed on an upper surface of a photographically inert liner. The liner also has a lower surface. A container is utilized for storing the sheets of photosensitive material. The container has a base on which the liner is placed, the lower surface of the liner is in contact with the base. The top surface of the liner to the bottom surface of the sheets has a first coefficient of friction and a bottom surface of one sheet to a top surface of another sheet has a second coefficient of friction. The second coefficient of friction is less than the first coefficient of friction, whereby multiple feeds of the sheets are reduced. Preferably, the bottom surface of the liner to the container has a third coefficient which is greater than the first coefficient of friction, whereby the liner is not fed with the last sheets. Also, the roller drive surface to a top surface of a sheet has a fourth coefficient of friction which is greater than the first coefficient of friction, whereby the last sheet may be fed without the liner. The fourth coefficient of friction is also greater than the second coefficient of friction, whereby the sheets may be fed by movement of the drive roller. Also, the roller drive surface of the roller to the top surface of the liner has a fifth coefficient of friction which is less than the third coefficient of friction, whereby the liner is not ejected from the container as the container is ejected from the imaging device.

Another embodiment includes a photosensitive package for use with an imaging device having a kick feed mechanism. The kick feed mechanism has a drive roller with a drive surface and a container having a base, wherein the container fits within the entry port of the imaging unit to provide a light-tight environment. The package includes a photographically inert liner which has an upper surface and a lower surface. A plurality of sheets of photosensitive material are placed on the upper surface of the liner. A removable light-tight enclosure is included in which the liner and sheets are positioned. The enclosure is removed after being placed in the container which is then placed in the entry port, thereby leaving the lower surface of the liner in contact with the base. The top surface of the liner to the sheets has a first coefficient of friction and the bottom surface of one sheet to the top surface of another sheet having a second coefficient of friction. The second coefficient of friction is less than the first coefficient of friction, whereby multiple feeds of the sheets are reduced. Preferably, the bottom surface of the liner to the container has a third coefficient which is greater than the first coefficient of friction, whereby the liner is not fed with the last sheets. Also, the roller drive surface to a top surface of a sheet has a fourth coefficient of friction which is greater than the first coefficient of friction, whereby the last sheet may be fed. The fourth coefficient of friction is also greater than the second coefficient of friction, whereby the sheets may be fed by movement of the drive roller. Also, the roller drive surface of the roller to the top surface of the liner has a fifth coefficient of friction which is less than the third coefficient of friction, whereby the liner is not ejected from the container as the container is ejected from the imaging device.

BRIEF DESCRIPTION OF THE DRAWINGS

FIG. 1 is a perspective view of one embodiment of an imaging unit with an empty container and a liner shown in an exploded position;

FIG. 2 is a cross-sectional side view of the container inserted within the imaging unit which includes a kick feed mechanism; and FIG. 3 is a perspective view of a light-tight package holding sheets of photosensitive material.

DETAILED DESCRIPTION

The present invention is a sheet feed apparatus for multiple sheets of photosensitive material positioned on a liner and enabling individual sheets to be fed to an imaging station of an imaging unit. The photosensitive material includes both photosensitive films and papers. One embodiment of the container is a carriage 10, a reusable component which mates with a feed station (not shown) of the imaging unit 12 by passing through an entry port 14, as shown in FIG. 1. The carriage 10 is shown being placed within the imaging unit 12 such that the carriage 10 is in a horizontal position even through it could be oriented differently within the imaging unit 12.

The carriage 10 can include a base 16 upon which the sheets of photosensitive material 18 can be placed. The carriage 10 can also include a front ramp 20 which extends upwardly and outwardly from one end of the base 16. Optionally, this carriage 10 includes side walls 22, 24 which extend substantially upwardly from the base 16.

In FIG. 3, a light-tight enclosure for supplying the sheets of photosensitive film 18 and liner 19 is shown. The carriage 10 can be daylight loaded when used in conjunction with sheets 18, which are contained within a light-tight bag 30. As referenced in this application, the sheets of photosensitive material are designated 18, with the top sheet in the stack 18a and the bottom sheet 18b. Each sheet 18 has a top surface and a bottom surface. The bag 30 can surround the liner 19 on which the film rests. The bag 30 has two sides 31, 32, a back end 33, and a front end 34. The seals 35 may be made thermally if the bag 30 is a thermoplastic. Sealing the bag 30 inward from the back end 33 creates a bag tab 36. The tab 36 can have a chevron shape.

The front end 34 of the bag 30 is not sealed, but is rolled back and adhered to the middle section 37 of the bag 30 to maintain the light-tight enclosure of the sheets 18. The front end 34 can be adhered with a piece of perforated tape 38 which is broken by a user just prior to inserting the carriage 10 into the imaging unit 12. Although the tape 38 no longer holds the bag closed, the bag 30 remains folded in light-tight due to the set the film bag 30 has taken in the folded position. To insert the bag 30 into the carriage 10, the carriage 10 is first removed from the imaging unit 12. The spent liner is removed and discarded. Because the present invention allows the carriage 10 to be entirely removed from the imaging unit 12, a user can easily position the bag 30 within the carriage 10. The carriage 10 can clamp the back end 33 of the bag 30 before being reinserted into the imaging unit 12. Once inserted, the carriage 10, mated with the feed station of the imaging unit 12, creates a light-tight environment for the bag 30. One embodiment of such a device is shown in co-pending U.S. patent application Ser. No. 08/344,462, filed Nov. 23, 1994, entitled "IMAGING UNIT CONTAINER HAVING SHIFTABLE WALLS", which is hereby incorporated by reference. Once the bag 30 is removed, when the carriage 10 is inside of the imaging unit 12, the liner 19 is positioned on top of the base 16.

One example of a kick feed mechanism 25 within the imaging unit 12 can frictionally slide the top sheet 18a from the carriage 10, as shown in FIG. 2, and feed it toward the imaging station. The front ramp 20 facilitates the sliding of the top sheet out of the container while being sufficiently vertical to hold the remaining sheets within the carriage 10. The angle A of the front ramp 20 need only be sufficient to guide the top sheet from the carriage 10 and into the imaging unit 12. For example, the angle A of between 30 and 85 degrees is sufficient, although other angles can suffice. More preferably, the angle A is approximately 60 degrees.

One example of a kick feed mechanism 25 includes a linkage having members 25a and 25b upon which a drive roller 25c is rotatable mounted. The linkage 25b slides within a slot 25d in order to bring the drive roller 25c in contact with the top sheet of the sheet of photosensitive material 18a, or the liner 19, as will be described more fully hereafter. The drive roller 25c has a outer drive surface 25e which is cylindrical. The controls to operate the kick feed mechanism 25 are well known in the art. The drive roller 25c is adapted to be driven in either direction. As shown in FIG. 2, it is rotating in the direction to feed the photosensitive material 18 into the imaging unit 12. To feed the sheets, the drive roller rotates until the trailing edge of sheet 18a passes, then the roller reverses direction to hold the remaining sheets in place. By this time, the sheet 18a is between nip rollers (not shown) which further feeds the sheet.

One example of a liner 19 has a liner member 19a with a top surface 19b which is textured to increase the friction between the top surface 19b and the bottom sheet 18b of the photosensitive material. Operatively connected to the liner member 19a and extending generally upwardly is an end member 19c to which a top member 19d is connected. The liner has a bottom surface 19e which is positioned on the base 16 of the container 10. The liner is a photographically inert material such as ABS. The liner member 19a is sized approximately the same as the photosensitive sheet material 18. The liner member 19a is generally rectangular and has two notches 76 along its sides. The notches 76 have a front edge 76a, a back edge 76b, and a side 76c.

The base 16, under the liner member 19a, is generally planar. However, two raised areas 81 and 82 extend above the generally planar surface. The raised area 81 has a leading edge 81a. The raised area 82 has a trailing edge 82a. The distance from the trailing edge 82a to the leading edge 81 a is approximately the distance of the length of the notch 76 and is slightly less than the distance between 76a to 76b. The difference between the distances is approximately ⅜". The notch 76 is positioned over the raised area 81 and 82. The raised areas 81 and 82, in conjunction with the notch 76 form an interlock between the base 16 and the liner 19. As shown in FIG. 1, the notch 76 is positioned over the raised areas 81 and 82. Front edge 76a of the notch 76 is positioned proximate the leading edge 81a and prevents movement in a first direction. The edge 76b of notch 76 is proximate the trailing edge 82a and prevents movement in the opposite direction. The height of the raised areas 81 and 82 is approximately equal to or less than the thickness of the liner 19, approximately 0.03 inches. As shown in FIG. 1, only one set of raised areas 81 and 82 are shown. However, another pair of raised areas 81 and 82 are positioned beneath the second notch 76, and are hidden from view in the perspective view of FIG. 1. While the interlock feature is shown on both sides of the container 10, it is understood that only one interlock feature may be utilized, although two is preferred. Other embodiments of interlocks may include a single raised rectangular area along the center line of the container with a corresponding opening in the liner 19.

One example of the photosensitive sheet material 18 would be a photothermographic film. The liner 19 may be made from ABS surface treated sheet stock. The tray may also be made from ABS and may be injected molded. A drive roller surface is a non-conductive polyurethane.

Surface characteristics of all of these components are suitably adjusted to achieve the results discussed hereafter.

As previously indicated, the relationship between the coefficient of friction between the various components of this system is important in order to ensure the proper feeding of the sheets of photosensitive material 18 as well as the retention of the liner 19 in its appropriate place. The top surface 19b of the liner has a first coefficient of friction with the bottom surface of the bottom sheet 18b of the stack of photosensitive material. The coefficient of friction between the individual sheets of photosensitive material 18, that is the top surface of a lower sheet to the bottom surface of an upper sheet has a second coefficient of friction. The second coefficient of friction must be less than the first coefficient of friction to reduce or eliminate multiple feeds of the sheets of material 18. Further, the bottom surface 19e of the liner 19 to the base 16 of the container has a third coefficient of friction. This third coefficient of friction must be greater than the first coefficient of friction to ensure that the liner is not fed with the last sheet of photosensitive material 18. While it is understood that various surface textures may be given to arrive at the appropriate third coefficient of friction, it has been found beneficial to use the interlock feature previously described between the liner and the container to allow for sufficient friction between the liner and base of the container. Therefore, when the "third coefficient of friction" is used, it refers not only to the coefficient of friction between the liner and the base, but also the additional locking force formed by the interlock feature previously described, if such an interlock feature is utilized.

The drive surface 25e of the drive roller 25c to the top surface of the sheet 18a has a fourth coefficient of friction. This fourth coefficient of friction is greater than the first coefficient of friction, wherein the last sheet may be fed into the imaging, unit 12. Further, the fourth coefficient of friction is greater than the second coefficient of friction, wherein the individual sheets may be fed by movement of the drive roller.

In addition to the drive roller being driven in the direction shown in FIG. 2, after the last sheet of material 18b has been dispensed, the imaging unit 12 will reverse the rotation of the drive roller 25c. The purpose of this is to kick out the container 10 from the entry port 14. When doing so, it is important that the liner not be dispensed out of the back of the container 10. In order to do so, it is necessary that a fifth coefficient of friction between the roller and liner be less than the third coefficient of friction, which is the coefficient of friction between the liner and base of the container so as to ensure that the container is kicked out from the entry port with the liner remaining properly positioned in the container.

It is understood that the various components may be suitably manufactured to have varying coefficients of friction, as it is well known in the art how to make the components have different coefficients of friction by slightly altering their composition or method of manufacture. It is the relative relationships previously discussed that are important.

One well known method of determining the coefficient of friction between two surfaces is an incline plane tester. In such a tester, the two materials to be tested are placed on top of each other and one end of the tester is then raised. As the angle is increased, the top material will eventually slide over the bottom material. This is referred to as the release angle. Examples of suitable release angles for the components of the present invention are as follows:

| Coefficient of Friction No. | Description | Release Angle |
| --- | --- | --- |
| 1 | The top surface of the liner to the bottom surface of the sheets | 29/ |
| 2 | The bottom of one sheet to the top of another sheet | 26/ |
| 3 | The bottom surface of the greater than liner to the container | 29/ |
| 4 | The roller drive surface to a top surface of a sheet | 40/ |
| 5 | The roller drive surface to the top surface of the liner | 26/ |

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A sheet feed apparatus for an imaging device, comprising:

a kick feed mechanism having a drive roller, the drive roller having a drive surface;

a plurality of sheets of photosensitive material, each sheet having a top surface and a bottom surface;

a photographically inert liner having an upper surface and a lower surface, the sheets placed on the upper surface of the liner;

a container for storing the sheets of photosensitive material, the container having a base on which the liner is placed, the lower surface of the liner in contact with the base; and the top surface of the liner to the bottom surface of the sheets having a first coefficient of friction and the bottom of one sheet to the top of another sheet having a second coefficient of friction, the second coefficient friction being less than the first coefficient of friction, whereby multiple feeds of the sheets are reduced.

2. The sheet feed apparatus of claim 1, further comprising the bottom surface of the liner to the container having a third coefficient of friction, the third coefficient of friction being greater than the first coefficient of friction, whereby the liner is not fed with the last sheets.

3. The sheet feed apparatus of claim 2, further comprising the roller drive surface to a top surface of a sheet having a fourth coefficient of friction, the fourth coefficient of friction being greater than the first coefficient of friction, wherein the last sheet may be fed.

4. The sheet feed apparatus of claim 3, wherein the fourth coefficient of friction is greater than the second coefficient of friction, wherein the sheets may be fed by movement of the drive roller.

5. The sheet feed apparatus of claim 4, wherein the liner is constructed from ABS and has a textured upper surface and a smooth bottom surface.

6. The sheet feed apparatus of claim 4, further comprising the roller drive surface of the roller to the top surface of the liner having a fifth coefficient of friction, the fifth coefficient of friction being less than the third coefficient of friction, whereby the liner is not ejected from the container as the container is ejected from the imaging device and the fifth coefficient of friction is sufficiently high to allow the container to be ejected by reverse rotation of the kick feed mechanism.

7. A photosensitive package for use with an imaging device having a kick feed mechanism having a drive roller with a drive surface and a container having a base, wherein the container fits within an entry port of the imaging unit to provide a light-tight environment, and comprises:
 a photographically inert liner having an upper surface and a lower surface;
 a plurality of sheets of photosensitive material each sheet having a top surface and a bottom surface, the sheets placed on the upper surface of the liner;
 a removable light-tight enclosure in which the liner and sheets are positioned, the enclosure being removed after being placed in the container which is then placed in the entry port, thereby leaving the lower surface of the liner in contact with the base; and
 the top surface of the liner to the bottom of the sheets having a first coefficient of friction and the bottom surface of one sheet to the top of another sheet having a second coefficient of friction, the second coefficient of friction being less than the first coefficient of friction, whereby multiple feeds of the sheets are reduced.

8. The photosensitive package of claim 7, further comprising the bottom surface of the liner to the container having a third coefficient of friction, the third coefficient of friction being greater than the first coefficient of friction, whereby the liner is not fed with the last sheets.

9. The photosensitive package of claim 8, further comprising the roller drive surface to a top surface of a sheet having a fourth coefficient of friction, the fourth coefficient of friction being greater than the first coefficient of friction, wherein the last sheet may be fed.

10. The photosensitive package of claim 9, wherein the fourth coefficient of friction is greater than the second coefficient of friction, wherein the sheets may be fed by movement of the drive roller.

11. The photosensitive package of claim 10, wherein the liner is constructed from ABS and has a textured upper surface and a smooth bottom surface.

12. The photosensitive package of claim 10, further comprising the roller drive surface of the roller to the top surface of the liner having a fifth coefficient of friction, the fifth coefficient of friction being less than the third coefficient of friction, whereby the liner is not ejected from the container as the container is ejected from the imaging device and the fifth coefficient of friction is sufficiently high to allow the container to be ejected by reverse rotation of the kick feed mechanism.

* * * * *